US006808195B2

(12) United States Patent
Smith (10) Patent No.: US 6,808,195 B2
(45) Date of Patent: Oct. 26, 2004

(54) HITCH BALL ENGAGING ASSEMBLY AND APPARATUS USABLE TO INTERCONNECT FIFTH WHEEL TRAILER COUPLING TO A GOOSENECK TRACTOR COUPLING

(76) Inventor: Jerry R. Smith, 5690 W. Rowland Ave., Littleton, CO (US) 80123

( * ) Notice: Subject to any disclaimer, the term of this patent is extended or adjusted under 35 U.S.C. 154(b) by 35 days.

(21) Appl. No.: 10/099,921

(22) Filed: Mar. 14, 2002

(65) Prior Publication Data

US 2003/0173757 A1 Sep. 18, 2003

(51) Int. Cl.[7] .................................................. B60D 1/07
(52) U.S. Cl. .................................. 280/417.1; 280/416.1
(58) Field of Search ......................... 280/417.1, 416.1, 280/416.3, 415.1, 418.1, 504, 511

(56) References Cited

U.S. PATENT DOCUMENTS

| | | | | |
|---|---|---|---|---|
| 4,576,395 A | * | 3/1986 | Longoria | 280/511 |
| 4,887,831 A | * | 12/1989 | Edwards | 280/416.3 |
| 5,240,270 A | * | 8/1993 | Colibert | 280/417.1 |
| 5,513,869 A | * | 5/1996 | Putnam | 280/415.1 |
| 5,868,415 A | * | 2/1999 | Van Vleet | 280/483 |
| 6,024,372 A | * | 2/2000 | Colibert et al. | 280/417.1 |
| 6,050,588 A | * | 4/2000 | Kissack | 280/511 |
| 6,234,509 B1 | * | 5/2001 | Lara | 280/425.2 |
| 6,264,229 B1 | * | 7/2001 | Gill et al. | 280/441.2 |
| 6,540,246 B2 | * | 4/2003 | Andersen et al. | 280/417.1 |

\* cited by examiner

*Primary Examiner*—Lesley D. Morris
*Assistant Examiner*—Matthew Luby
(74) *Attorney, Agent, or Firm*—Timothy J. Martin; Michael R. Henson; Rebecca A. Gegick (57) ABSTRACT

A hitch ball engaging assembly provides a socket to receive a hitch ball with at least one locking element. A rotatable locking collar rotates between first and second positions respectively to move the locking element between a locked state and an unlocked state. A latch can be provided to retain the collar in the first and/or second positions. The locking element(s) may be ball(s) in holes in the socket and the collar has cam surfaces to move the ball(s). The hitch ball engaging assembly may particularly be used in an adapter to interconnect a pin connector of a fifth wheel coupling to the hitch ball of a gooseneck coupling. Here, an extension member is provided with a pin connector assembly to secure the fifth wheel pin on one end and the hitch ball engaging assembly on the other end. The invention includes methods accomplished by these structures.

41 Claims, 6 Drawing Sheets

HITCH BALL ENGAGING ASSEMBLY AND APPARATUS USABLE TO INTERCONNECT FIFTH WHEEL TRAILER COUPLING TO A GOOSENECK TRACTOR COUPLING

FIELD OF THE INVENTION

The present invention broadly concerns the interconnection of a trailer to a tractor vehicle for towing. More particularly, however, the present invention concerns hitch ball engaging assembly. This assembly is useable as an improvement to a tractor/trailer combination wherein the tractor vehicle is provided with a bed mounted hitch ball of a gooseneck type coupling and for in the trailer vehicle is provided with a fifth wheel type pin connector. The invention then concerns an adapter apparatus that is operative to releaseably interconnect these two different types of couplings.

BACKGROUND OF THE INVENTION

For many years, recreational traveling has enjoyed popularity among a wide spectrum of the population. Despite the availability of overnight accommodations at hotels, motels and the like, many travelers seek alternative accommodations either as a life-style preference or as a money saving measure. Also, convenient hotel/motel lodgings are not also available at target recreation sights so that alternative accommodations must be made. Here, many travelers prefer to use their own accommodations which are transported with them.

While the simplest form of portable accommodations may be the tent, many travelers find tents to be inconvenient or uncomfortable. Accordingly, many travelers opt for other portable accommodations such as tent trailers, recreational vehicles and travel trailers known as "fifth wheel travel trailers".

As is known, a fifth-wheel travel trailer is, essentially, a small, self-contained home which may be towed to a desired location by any suitable tractor vehicle. For example, a pickup truck. In the fifth-wheel coupling system, the forward portion of the trailer is provided with a downwardly depending hitch box and a downwardly projecting king pin, also referred to as a "pin connector". This king pin is sized and adapted to mate with a standard fifth-wheel hitch which is mounted on the tractor vehicle. The fifth-wheel hitch is in the form of a large slotted plate that is suitably secured to a support structure on the bed of the tractor vehicle. The pin connector is received in a slot in the plate, and a latch mechanism releaseably retains the pin connector in the engaged state. The slotted plate is sufficiently elevated above the bed of the tractor vehicle so as to match the height of the pin connector above the ground during a normal towing operation. Accordingly, the tractor vehicle supports the trailer so that it's forward end is elevated above the surface of travel, such as a roadway, although the rear portion of the vehicle is supported on a wheel set so that it may travel over the surface.

Aside from the fifth-wheel hitch assembly, another commonly used hitch assembly for coupling a tractor vehicle to a trailer vehicle is known as the "gooseneck coupling". IN the gooseneck system, a hitch ball is mounted on or proximately to the bed of the tractor vehicle. The trailer vehicle is provided with an elongated, downwardly depending connector having a socket end that may be dropped onto and secured to the hitch ball of the trailer vehicle. Gooseneck coupling systems are typical used for industrial and farming applications, for example, horse trailers and the like.

Where a hauler employs a tractor vehicle that is provided with a hitch ball for a gooseneck coupling system, he/she cannot normally employ such tractor vehicle with a trailer having the pin connector of the fifth wheel coupling system. In past, it has been known to provide a fifth wheel adapter assembly that mounts onto the hitch ball of the tractor vehicle. Here, a pivoting, slotted plate assembly is mounted on the hitch ball and provides the slotted plate that receives the pin connector of the fifth wheel coupling on the trailer vehicle. This fifth wheel adapter assembly, however, is mounted onto and stays attached to the tractor vehicle during use.

Accordingly, while there has been a recognized need for systems which allow a tractor vehicle to selectively tow a fifth wheel trailer or a gooseneck trailer, the problem has been addressed by complicated systems that allow the mounting of a fifth wheel hitch onto the tractor vehicle. The systems are complicated and expensive for the user. Thus there remains a need for a simplified adapter that can interface fifth wheel trailers with tractor vehicles provided with a gooseneck hitch ball. The present invention addresses this need.

SUMMARY OF THE INVENTION

It is an object of the present invention to provide and new and useful hitch ball engaging assembly.

Another object of the present invention is to provide an adapter apparatus using the hitch ball engaging assembly to interconnect a pin connector of a fifth wheel type tractor/trailer coupling and a hitch ball of a gooseneck type tractor/trailer coupling.

Yet another object of the present invention is provide an adapter apparatus and method that simplifies the attachment of a trailer having a fifth wheel type pin connector to the hitch ball of a gooseneck type connector on a tractor vehicle.

Still a further object of the present invention is to provide an inexpensive adapter that is an improvement to a tractor/trailer combination allowing the bed-mounted hitch ball of a gooseneck type coupling on a tractor vehicle to be connected to the fifth wheel type pin connector of a trailer vehicle.

It is a further object of the present invention to provide such an adapter that is easy to manufacture and use.

Still a further object of the present invention is to provide a method for interconnecting a pin connector of a fifth wheel type tractor/trailer coupling and a hitch ball of a gooseneck type tractor/trailer coupling.

According to the present invention, then, an adapter apparatus is provided that is operative to interconnect a pin connector of a fifth wheel type tractor/trailer coupling and hitch ball of a gooseneck type tractor/trailer coupling. Broadly, the adapter apparatus includes an extension member that has a first end portion and a second end portion opposite the first end portion. A pin connector engaging assembly is disposed on the first end portion of the extension member. This pin connector engaging assembly is sized and adapted to mateably receive a pin connector of a fifth wheel type tractor/trailer coupling. At least one attachment element is associated with the pin connector engaging assembly and is adapted to releaseably engage the pin connector of the fifth wheel type tractor/trailer coupling thereby to prevent removal of the pin connector when in a secured state. A hitch ball engaging assembly is disposed on the second end portion of the extension member. The hitch ball engaging assembly is sized and adapted to matably receive a hitch ball of a gooseneck type tractor/trailer coupling. The hitch ball engaging assembly includes at least one locking element associated therewith that is moveable between a locked stated and an unlocked state. When the locking element is in the locked state, it is operative to lock the hitch ball in the hitch ball engaging assembly thereby to prevent removal thereof. When the locking element is in the unlocked state, it is operative to permit insertion and removal of the hitch ball into and out of the hitch ball engaging assembly.

The extension member may be formed as an elongated shaft, such as an elongated tubular piece that in the disclosed embodiment is cylindrical in shape. Thus, the extension member has a first end portion with a surrounding first sidewall with a first interior sized and adapted to matably receive the pin connector of the fifth wheel type tractor/trailer coupling. Likewise, the second end portion then includes a surrounding second sidewall having a second interior adapted to matably receive the hitch ball of the gooseneck type tractor/trailer coupling. This second sidewall has at least one hole formed there through with the hole diameter. The hitch ball engaging assembly then includes at least one spherical ball that is disposed in the hole and that has a larger diameter than the hole. The spherical ball moves between a locked state that prevents removal of the hitch ball that is received in the second end portion and an unlocked state that permits insertion removal of the hitch ball into and out of the second end portion. A rotatable locking collar is provided that moves between first and second position. In the first position, the locking collar is operative to move the spherical ball into the locked state. In the second position, the locking collar is operative to permit the spherical ball to move into the unlocked state.

In more detail, the second end portion has a plurality of holes formed therein and the hitch ball engaging assembly includes a plurality of spherical balls respectively disposed in each hole. These holes and the balls are equiangularly spaced around the extension member. The locking collar has a plurality of recesses that are each operative to receive a respective one of the spherical balls in the unlocked state when the locking collar is in the second position. The locking collar also includes a plurality of cam faces with each cam face being operative to place a respective one of the spherical balls in a locked state when the locking collar is in the first position.

The hitch ball engaging assembly can include a latch that is operative to selectively retain the locking collar in a selected one of the first and second positions. An actuator member may be adapted to move the locking collar between the first and second position. To this end, and in greater detail, a base plate may be secured to the second end of the extension member and a retaining ring may be secured to the second end portion of the extension member and spaced relation to the base plate. The locking collar is rotatably disposed between the retaining ring and the base plate. The base plate may include a flange with a slot formed therein. The actuator then is formed as an elongated rod that is affixed to and projects radially outwardly from the locking collar with a distal end portion of the rod being received in the slot. The slot and the flange can have first and second detents sections corresponding to the first and second positions of the locking collar. The detent sections are operative to selectively retain the rod thereby to retain the locking collar in the selected one of the first and second positions.

The attachment elements for the pin connector engaging assembly can be, for example, set screws or bolts that fasten the extension tube directly to the pin connector. Alternative structure includes an adapter collar that fastens to the pin connector and a head piece that fastens to the adapter collar. The extension member is then telescopically received by the head piece.

The present invention is accordingly directed to a tractor/trailer combination when a tractor vehicle is provided with a bed-mounted hitch ball adapted for connection to a gooseneck type coupling and wherein a trailer vehicle is provided with a fifth wheel type pin connector. An improvement in the form of an adapter apparatus is described above permits the interconnection between the tractor/trailer vehicles. Here, again, the adapter includes an extension member having a first end portion with a pin connector engaging assembly sized and adapted to matably receive the pin connector and a second end portion sized and adapted to matably receive the hitch ball. At least one attachment element is associated with the pin connector engaging assembly to secure the pin connector while at least one locking element is associated with the hitch ball engaging assembly to move between a locked state and an unlocked state to secure the hitch ball. The improvement can include any of the features noted above with respect to the more detailed structure.

In addition to the apparatus described above, the present invention contemplates a method of interconnecting a pin connector of the fifth wheel type tractor/trailer coupling and a hitch ball of a gooseneck type tractor/trailer coupling. This method includes engaging the pin connector of the fifth wheel type tractor/trailer coupling with a first end portion of a rigid, elongated tubular member. The pin connector is releaseably secured to the first end portion. The method includes the engaging of the hitch ball with a second end portion of the elongated tubular member and releaseably securing the hitch ball to the second end portion.

In the method, the step of engaging the pin connector may be accomplished by matably receiving the pin connector in an interior of the first end portion of the tubular member. The step of engaging the hitch ball may be accomplished by matably receiving the hitch ball in the interior of the second end portion of the tubular member. The step of securing the hitch ball to the second end portion can be accomplished by providing a locking element on the second end portion that is movable between a locked state that is operative to lock the mated hitch ball thereby to prevent removal thereof in an unlocked state operative to permit insertion and removal of the hitch ball. The method can also include the step of selectively retaining the locking element in the locked state and in the unlocked state.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention is broadly directed to an improvement to a tractor/trailer combination when a tractor vehicle is provided with a bed-mounted hitch ball adapted for connection to a gooseneck type coupling and wherein a trailer vehicle is provided with a fifth wheel type pin connector. Specifically, this invention concerns an adapter apparatus that is operative to interconnect the pin connector to the hitch ball so that a tractor vehicle provided with a gooseneck type hitch ball may be used not only to haul trailers having gooseneck couplings but also to haul trailers provided with fifth wheel type couplings. The present invention is therefore also directed to method of interconnecting the pin connector to the hitch ball.

Figure 1:
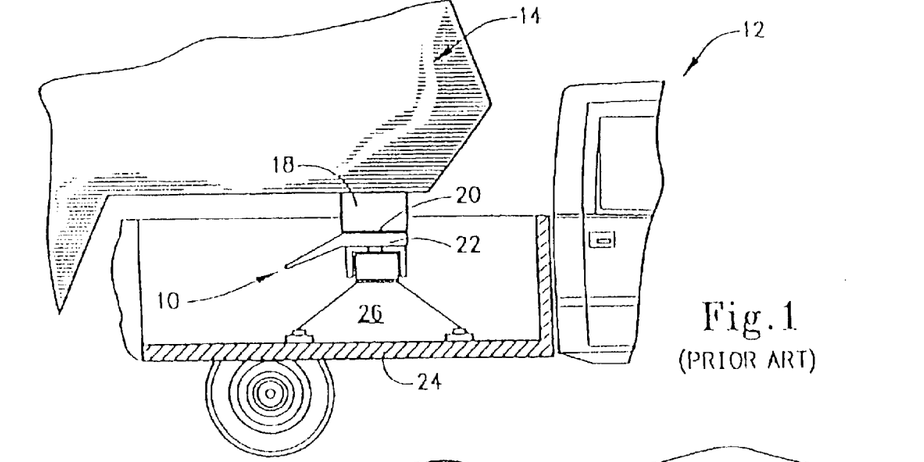
FIG. 1 is a side view in elevation, in partial cross-section, showing a fifth wheel tractor/trailer coupling assembly according to the prior art.
Figure 2:
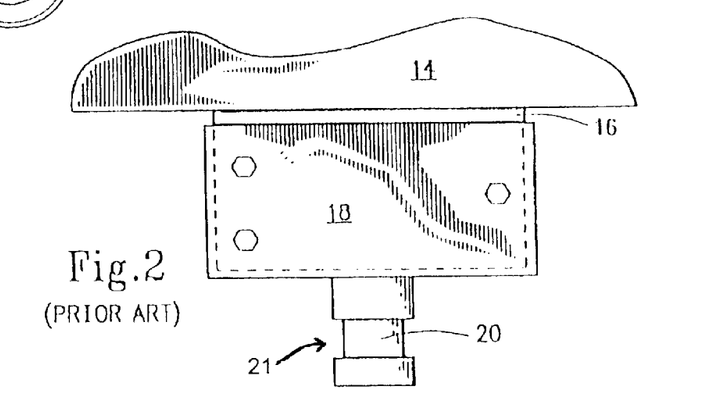
FIG. 2 is a side view in elevation of the hitch box of a fifth wheel type tractor/trailer coupling.

In order to best understand the present invention, it is perhaps helpful to first consider the structure of fifth wheel type tractor/trailer couplings as well as the structure of gooseneck type tractor/trailer couplings. With reference first to FIGS. 1 and 2, it may be seen that a typical fifth wheel coupling assembly pin interconnects a tractor vehicle 12 to a trailer vehicle 14. Trailer vehicle 14 includes a pair of plates, such as plate 16, that support a hitch box 18 that mounts a downwardly depending pin connector 20 that is also referred to as a king pin. Thus, it should be understood, that the terms pin connector and king pin may be used interchangeably herein.

With reference again to FIG. 1, it may be seen that king pin 20 is adapted to be matably received by a slotted plate 22 that is secured to the bed 24 of tractor vehicle 12 by the fifth wheel mount 26. As indicated, this structure is that well known in the prior art.

Figure 3:
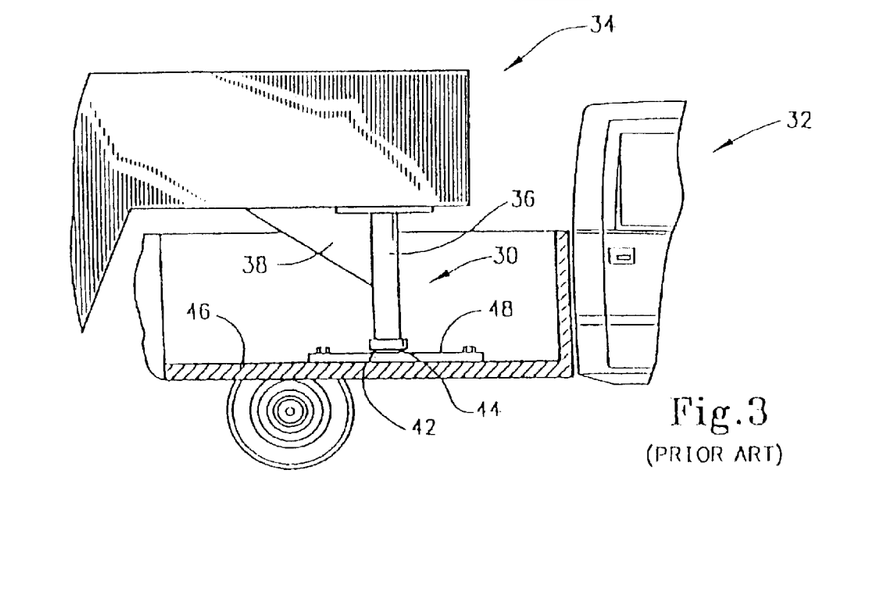
FIG. 3 is a side view in elevation and partial cross-section showing a gooseneck type tractor/trailer coupling assembly according to the prior art.
Figures 4, 5, 6, 7:
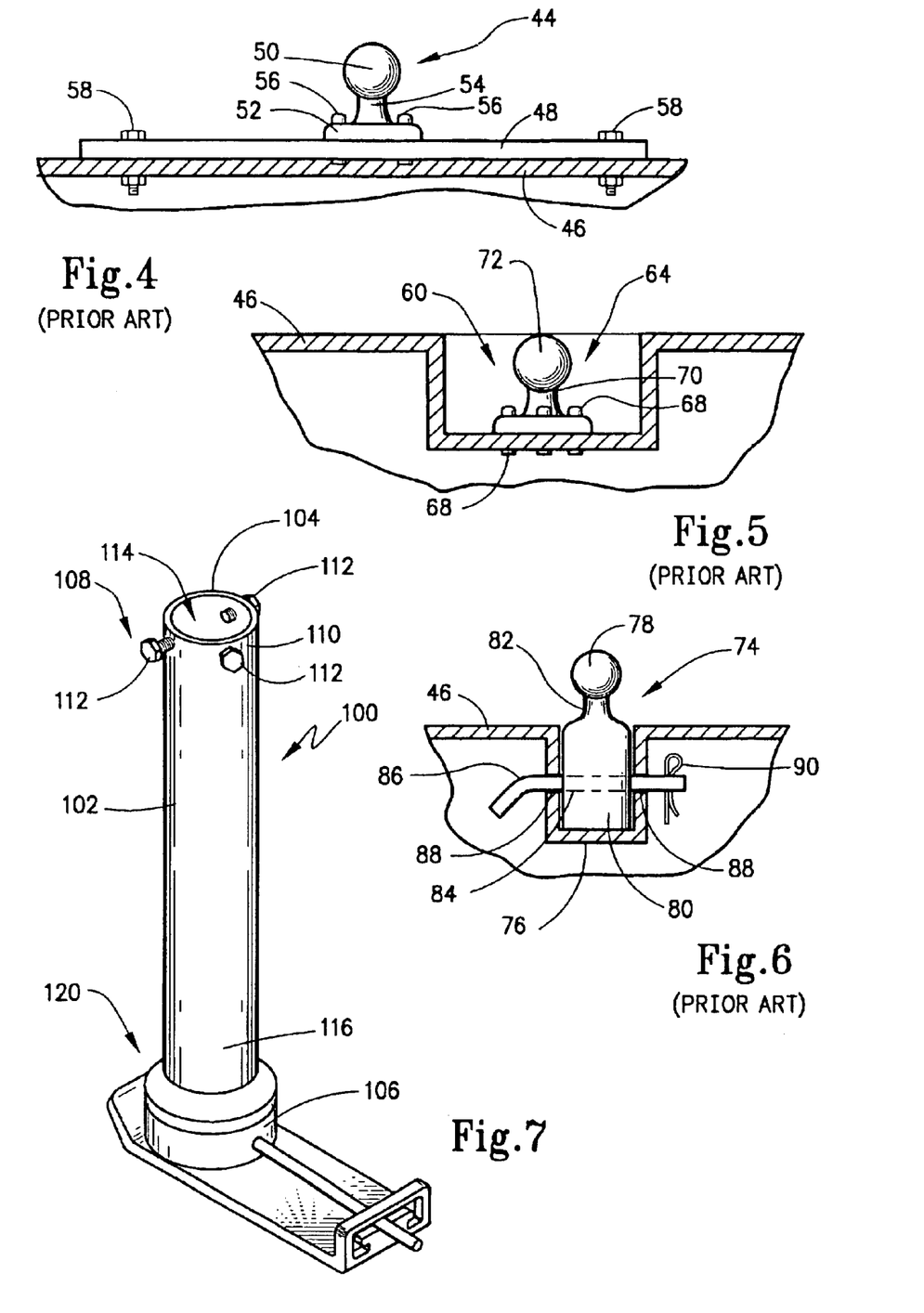
FIG. 4 is a side view in elevation and partial cross-section showing an example of a prior art mounting of a hitch ball for a gooseneck type coupling assembly to the bed of a tractor vehicle.
FIG. 5 is a side view in elevation and in partial cross-section showing a second alternative mounting of a hitch ball of a gooseneck type tractor/trailer coupling according to the prior art.
FIG. 6 is a side view in elevation and partial cross-section showing a third alternative mounting of a hitch ball according to the prior art for a gooseneck type tractor/trailer coupling.
FIG. 7 is a perspective view of an adapter apparatus according to the exemplary embodiments of the present invention.

With reference now to FIG. 3, it may be seen that a gooseneck coupling assembly 30 interconnects a tractor vehicle 32 with a trailer vehicle 34 gooseneck coupling assembly 30 includes a downwardly extending tubular connector 36 is affixed to and braced by brace plate 38 so as to be rigidly attached to trailer vehicle 34. Connector tube 36 terminates in a mouth 42 that extends over a hitch ball 44 of the gooseneck coupling assembly 30. Hitch ball 44 supported on bed 46 of tractor vehicle 32 by means of a mounting plate 48. The hitch balls used for gooseneck coupling assemblies according to the prior art can take a variety of forms, and three such examples are illustrated in FIGS. 4–6. With reference to FIG. 4, it may be seen that hitch ball 44 is attached by mounting plate 48 to bed 46 as noted with respect to FIG. 3. Hitch ball 44 includes a spherical ball portion 50 that is supported on a base 52 by means of an upright shaft 54 with base 52, shaft 54 and ball 50 normally being of an integral, one piece construction. Base 52 may be bolted, by bolts 56, to mounting plate 48 which in turn is secured to bed 46 by means of nut and bolt sets 58.

Alternatively, as is shown in FIG. 5, a hitch ball 64 can be inset into bed 46 of the tractor vehicle 32 in a recess 60 formed therein. Again, hitch ball 64 has a base 66 secured by nut and bolt sets 68 and includes a shaft portion 70 and a ball portion 72.

Finally, as is shown in FIG. 6, yet another alternative gooseneck hitch ball 74 is shown mounted in socket 76 formed in bed 46 of the tractor vehicle. Here, hitch ball 74 includes a spherical ball portion 78 mounted to a shaft to a shank 80 by means of a shaft 82. Shank 80 has a transverse bore 84 formed therethrough, and a retaining pin 86 extends through openings 88 in socket 76 and through transverse bore 84 to releaseably secure hitch ball 74 therein. A clip 90 is provided to hold retaining pin 86 in position.

Figures 8, 9:
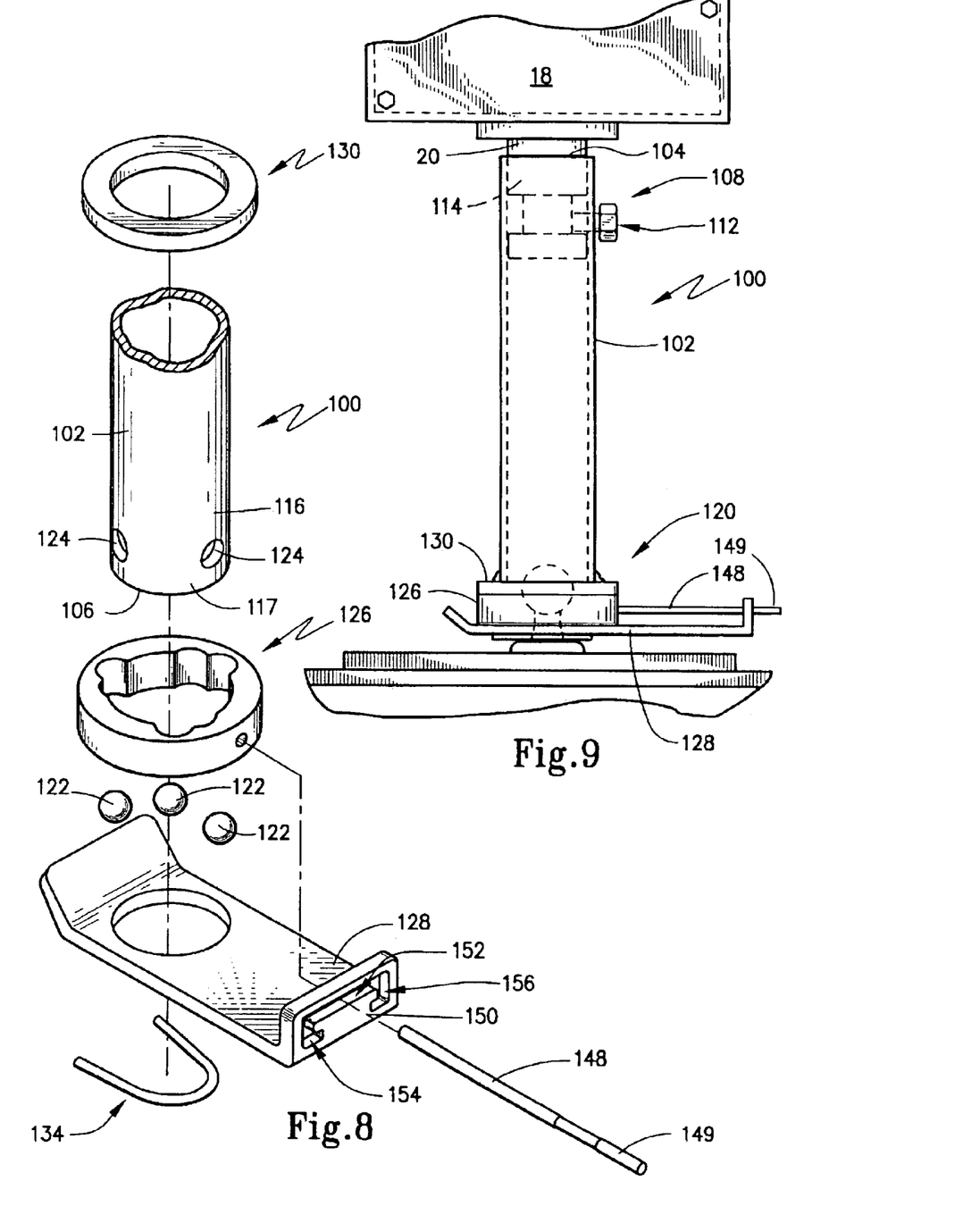
FIG. 8 is an exploded perspective view, partially broken away, showing the adapter apparatus of FIG. 7.
FIG. 9 is a side view in elevation showing the adapter apparatus of FIGS. 7 and 8 interconnected the hitch box of FIG. 2 to the hitch ball of FIG. 4.

The adapter apparatus according to the present invention is introduced in FIG. 7 and is also illustrated in FIGS. 8 and 9. With reference first to FIG. 7, it may seen that adapter apparatus 100 according to the exemplary embodiment of the present invention includes an extension member 102 that has a first end 104 and a second end 106 opposite first end 104. Extension member 102 is preferably in the form of an elongated shaft which, in the exemplary embodiment, is a cylindrical hollow tube formed of steel or other suitable rigid materials.

A pin connector engaging assembly 108 is disposed on a first end portion 110 of extension member 102, and the pin engaging assembly 108 is sized and adapted to matably receive the king pin or pin connector 20 of the fifth wheel type tractor/trailer coupling. To this end, pin connecting engaging assembly as shown in FIG. 7 includes a plurality of bolts or set screws 112 which project radially into the interior 114 of first end portion 110 and engage the annular channel 21 on the pin connector 20. As shown in FIG. 9, pin connector 20 may be inserted into interior 114 after which screws 112 may be tighten so that pin connector 20 is in a secured state. It should be understood, however, that other attachment elements then set screws 112 could be employed to secure pin connector 20 to extension member 102. In FIG. 7, it may be seen that the attachment elements, in the form of setscrews 112, are equiangularly spaced around the circumference of tubular extension member 102.

A hitch ball engaging assembly 120 is disposed on a second end portion 116 of extension member 102. Hitch ball engaging assembly 120 is sized and adapted to matably receive the hitch ball, such as hitch balls 44, 64, 74, of a gooseneck type tractor/trailer coupling as described above. To this end, and as described more thoroughly below, hitch ball engaging assembly 120 includes at least one locking element associated therewith that is moveable between a locked state and an unlocked state. When in the unlocked state, the locking element is operative to lock the hitch ball in the hitch ball engaging assembly thereby to prevent removal thereof yet is operative in the unlocked state to permit insertionary removal of the hitch ball into and out of the hitch ball engaging assembly.

Figures 10, 11, 12, 13:
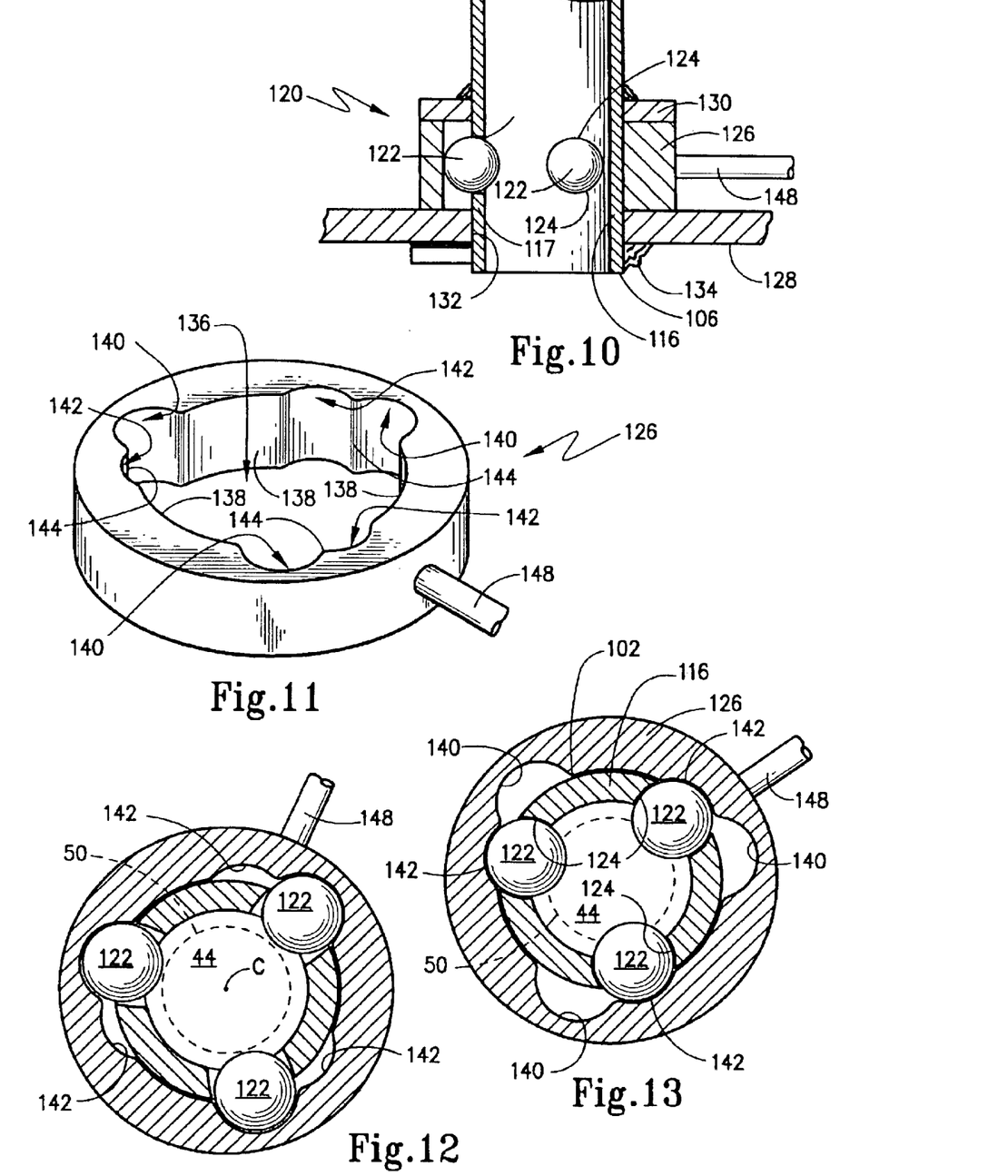
FIG. 10 is a side view in cross-section showing the hitch ball engaging assembly of the adapter apparatus of FIG. 7–9.
FIG. 11 is a perspective view of the locking collar used with the hitch ball engaging assembly of FIG. 10.
FIG. 12 is a top view in partial cross-section, showing the hitch ball engaging assembly with the locking elements in an unlocked state.
FIG. 13 is a top view in partial cross-section, similar to FIG. 12, showing the hitch ball engaging assembly with the locking elements in the locked state.

With reference now to FIGS. 8–10, it may be seen that hitch ball engaging assembly 120, according to this exemplary embodiment, employs three locking elements in the form of spherical ball bearings 122 that are seated in holes 124. Holes 124 are formed radially through sidewall 117 of second end portion 116 of extension member 102. Ball bearings 122 have a slightly larger diameter than holes 124 and are radially moveable with respect thereto under the influence of a locking collar 126. To this end, locking collar 126 is telescopically received on second end portion 116 and is rotatably journaled for movement therearound. To this end, locking collar 126 is interposed between a base plate 128 and a retaining ring 130 that are located on second end portion 116. As is shown in FIGS. 8 and 10, base plate 128 has a circular opening 132 that is sized for close fitted engagement with second end portion 116. Second end portion 116 is inserted through opening 132 and is welded in position. To this end, reinforcing bar 134 extends around and is circumjacent to end 106 to provide greater strength for the weldment. As is shown in FIG. 10, then, retaining ring 130 is welded onto second end portion 116 in spaced relation parallel to base plate 128. Locking collar 126 is positioned between retainer plate 130 and base plate 128 with spherical ball bearings 122 being held in position in holes 124 by means of locking collar 126.

Locking collar 126 is best seen in FIG. 11. It includes a central opening 136 that is bonded by three arcuate surfaces 138 that are equiangularly spaced from one another and are formed on the surface of an imaginary cylinder sized for close fitting engagement around the cylindrical outer wall of extension member 102. A plurality of recesses 140 are equiangularly spaced around locking collar 126 and communicate with central opening 136. Likewise, three cam surfaces 142 are equiangularly spaced around locking collar 126 and communicate with central opening 136. Cam surfaces 142 each have a common edge 144 with a respective recess 140.

The purposes of recesses 140 and cam surface 142 and their respective interaction with ball bearings 122 can now be more fully appreciated with respect to FIGS. 12 and 13. In FIG. 13, locking collar 126 is in a first position relative to second end portion 116 of extension member 102. In this position, ball bearings 122 have each been forced radially inwardly by cam surfaces 142 so that each ball 122 is completely seated in this respective hole 124. In this position, and as is shown in phantom, the spherical ball 50 of a representative hitch ball is locked in the interior of hitch ball engaging assembly 120 since the geometric diameter of spherical ball 50 exceeds the spacing between ball bearings 122. Cam surfaces 142 prevent radially outward movement of balls 122 so that a hitch ball, such as hitch ball 44, cannot be inserted into or removed from the hitch ball engaging assembly.

However, when locking collar 126 is rotated a few degrees relative to second end portion 116 of extension member 102, as is shown in FIG. 12, recesses 140 register with each ball bearing 122 when this occurs, ball bearings 122 can move radially outward from central access "C" of extension member 122 a sufficient distance so that the spherical ball portion 50 of representative hitch ball 44, again shown in phantom, can be inserted and removed from the interior of second end portion 116, that is, of hitch ball engaging assembly 120. Accordingly, it should be understood by the ordinarily skilled person in this field, that rotation of locking collar 126 between the first and second positions will move ball bearings 120 into the locked position or will allow them to move outwardly to release the respective hitch ball of the gooseneck tractor/trailer coupling.

With reference again to FIGS. 8–10, relative rotation of locking collar 126 is accomplished by means of an actuator in the form of a rod 148 that extends radially of locking collar 126. Base plate 128 includes an upwardly extending flange 150 that is provided with a slot 152 that terminates, at opposite ends, in detent sections 154 and 156. Distal end portion 149 of rod 148 is received in slot 152 and may be reciprocated therein between detent sections 154 and 156. When placed in detent section 154, locking collar 126 is rotated in a clockwise direction (in reference FIGS. 8, 12 and 13) such cam surfaces 142 advance ball bearings 122 into the locked state. When rod 148 is moved into detent section 156, locking collar 126 is rotated in a counter clockwise direction (again in reference to FIGS. 8, 12 and 13) so that recesses 140 each register with respective ball bearing 122 allowing them to move into an unlocked state. Accordingly, flange 150 along with slot 152 and detent sections 154 and 156 provide a latch that is operative to selectively retain the locking collar in a selected one of the first and second positions. Rod 148 provides an actuator member that may be manually operated to move the locking collar between the first and second positions.

Figure 14:
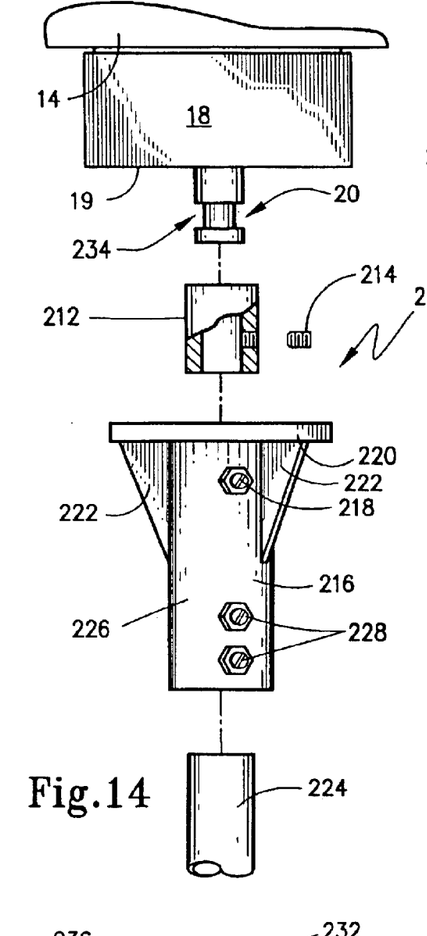
FIG. 14 is a is a side view in elevation and partial cross-section showing a hitch pin connector assembly for use with the present invention.

With reference to FIG. 14, a hitch pin connector assembly for use with the present invention is shown. Here, hitch pin connector assembly 210 is shown for connection to pin connector 20 of hitch box 18 on trailer vehicle 14. Hitch pin connector assembly 210 includes a collar 212 adapted to be telescopically received over pin connector 20 and secured thereto by means of a plurality of set screws, such as set screw 214. A head piece 216 is telescopically received over adaptor collar 212 and is secured thereto by means of set screws 218. Head piece 216 includes an annular flange 220 supported by reinforcement webs 222 with flange 220 adapted to abut surface 19 of hitch box 18, all as described more thoroughly below. An extension tube 224 is telescopically received within the interior of shank 226 of head piece 216 and may be adjustably positioned by means of set screws 228.

Figure 15:
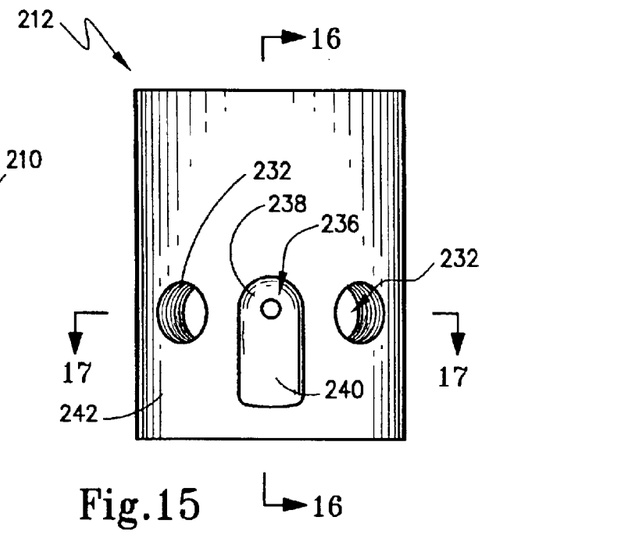
FIG. 15 is a side view in elevation showing an adapter collar of the hitch pin connector assembly of FIG. 14.
Figure 16:
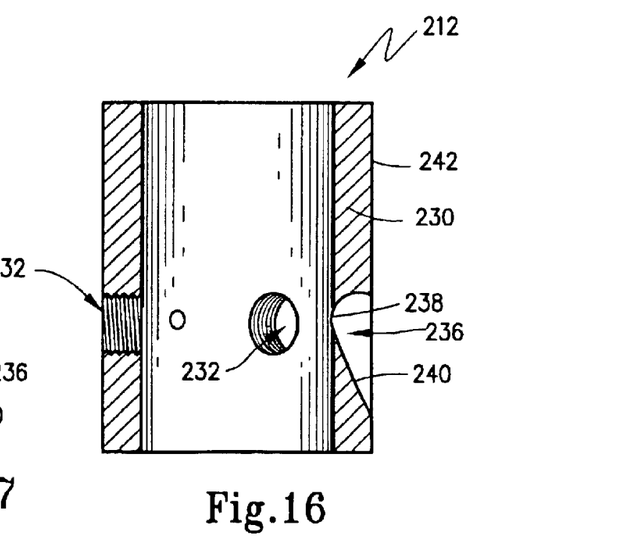
FIG. 16 is a cross-sectional view taken about lines 16—16 of FIG. 15.
Figure 17:
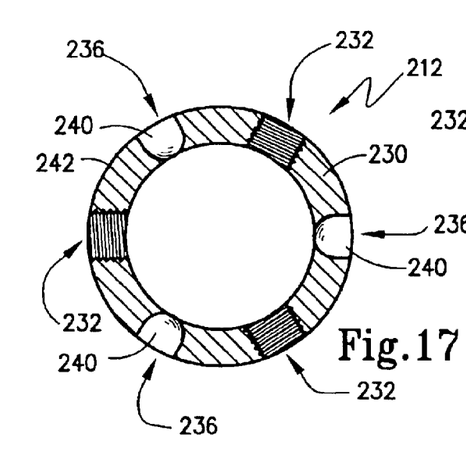
FIG. 17 is a cross-sectional view taken about lines 17—17 of FIG. 15.

The structure of adaptor collar 212 is shown in greater detail in FIGS. 15–17. Here, it may be seen that adaptor collar 212 is in the form of a cylindrical shell having a side wall 230 through which a plurality of radial bores 232 are formed. Bores 232 are threaded and may respectively receive each set screw 214. Bores 232 are equiangularly spaced around the central axis of adaptor collar 212 and, in the embodiment shown in FIGS. 15–17, three such bores 232 are provided. Bores 232 are longitudinally positioned so as to thread into annular channel 234 of hitch pin 20 in a manner similar to set screws 112. When tightened, set screws 214 will lock adaptor collar 212 onto hitch pin 20.

Adaptor collar 212 is also provided with a plurality of concavities 236 which are equiangularly spaced about side wall with a respective concavity 236 being located medially between a pair of bores 232, as is shown in FIG. 17. Each concavity 236 includes a hemispherical portion 238 that is generally in a common transverse plane as are the axes of bores 232. Hemispherical portion 238 communicates with an inclined wall portion 240 that extends obliquely to outer surface 242 so as to be oblique to the central axis of adaptor collar 212.

Figures 18, 19, 20:
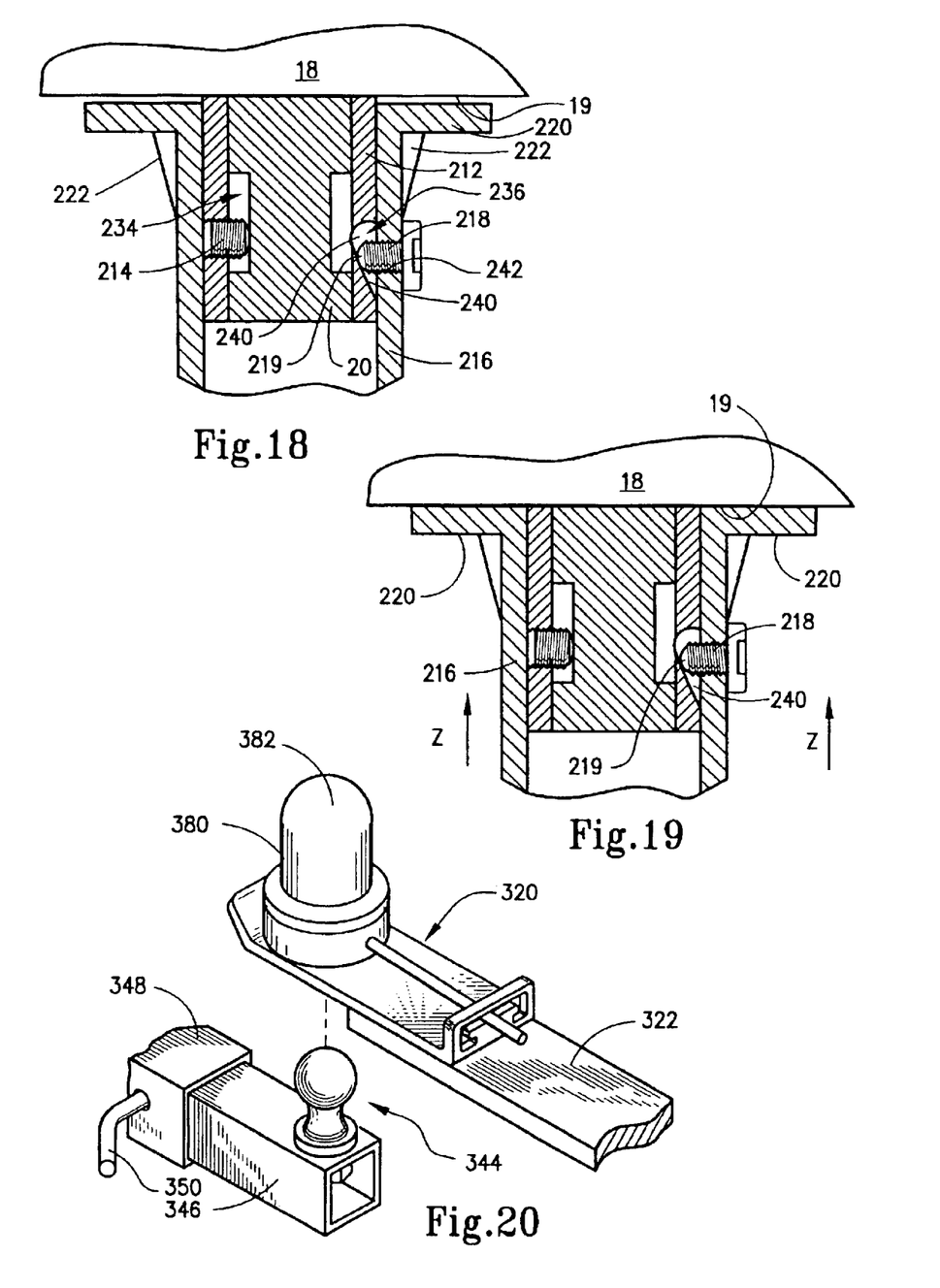
FIG. 18 is a side view in cross-section showing the head piece and collar of the hitch pin connector assembly of FIG. 14 in an initial mounted state.
FIG. 19 is a side view in cross-section showing the head piece and collar of the hitch pin connector assembly of FIG. 18 in a fully mounted state.
FIG. 20 is a perspective view of the hitch ball engaging assembly according to the present invention used in an alternative application.

With reference to FIGS. 18 and 19, the use and purpose of concavities 236 may be more fully appreciated. As is shown in FIG. 18, adaptor collar 212 has been rigidly affixed to connector pin 20 by means of the set screw 214 extending into annular channel 234. Head piece 216 has been telescopically inserted over adaptor collar 212 and set screws 218 have been threaded into bores, such as bore 242 in head piece 216 so that a nose 219 of set screw 218 extends into a concavity 236 and abuts inclined wall 240. It may be noted, however, in FIG. 18 that flange 220 has not been drawn tightly against surface 19 of hitch box 18. However, as is demonstrated in FIG. 19, the continued tightening of set screw 218 causes nose 219 to travel downwardly along inclined surface 240 in a ramp-like manner. When this happens, head piece 216 is drawn upwardly in the direction of arrows "Z" so that flange 220 is drawn against surface 19 of hitch box 18. Thus, head piece 216 becomes rigidly secured to the hitch box 18 and extension tube 224 may be adjustably positioned in head piece 216 by means of set screws 228. Extension tube 224 can carry hitch ball engaging assembly 120, as noted above.

Finally, turning to FIG. 20, it may be seen that the hitch ball engaging assembly according to the present invention may be used in an alternative applications. Here, for example, a hitch ball engaging assembly 320 is shown attached to a tongue 322, for example, of a trailer vehicle. Hitch ball engaging assembly 320 is shown for mounting onto a trailer hitch ball 344 that is secured to a hitch bar 346 received in a hitch receiver 348 and secured thereto by means of a hitch pin 350, as is known in the art. Hitch ball engaging assembly 320 is constructed identically to that described with respect to hitch ball engaging assembly 120. However, here, hitch ball engaging assembly 320 is fastened to a socket 380 that is hollow and receives the head of hitch ball 344 much in the manner of extension member 102 shown in FIG. 7. That is, socket 380 is the same as extension member 102 except that it is enclosed at rounded end 382 as shown in FIG. 20.

From the foregoing, it may be seen that the present invention provides an improvement to a tractor/trailer combination by providing an adapter apparatus that can interconnect the gooseneck type coupling on a tractor vehicle with the fifth wheel type pin connector or king pin of a trailer vehicle. The present invention is also directed to a method of interconnecting the pin connector of a fifth wheel type tractor/trailer coupling and a hitch ball of a gooseneck type tractor/trailer coupling. This method can include any of the steps inherent in the mechanical structures described above. Broadly, the method includes engaging the pin connector of the fifth wheel type tractor/trailer coupling with a first end portion of a rigid, elongated tubular member and releaseably securing the pin connector to that first end portion. The method includes engaging the hitch ball of the gooseneck type tractor/trailer with a second end portion of the tubular member and releaseably securing the hitch ball to that second end portion.

In this method, the step of engaging the pin connector can be accomplished by matably receiving the pin connector in an interior of the first end portion of the tubular member. Likewise, the step of engaging the hitch ball may be accomplished by matably receiving the hitch ball in the interior of the second end portion of the tubular member. The step of securing hitch ball to the second end portion can be accomplished by providing a locking element on the second portion that is movable between a locked state that is operative to lock the mated hitch ball thereby to prevent removal thereof and an unlocked state operative to permit insertion and removal of the mated hitch ball. This method may also include the step of selectively retaining the locking element in a selected one of the locked state and the unlocked state.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiment of the present invention without departing from the inventive concepts contained herein.

I claim:

1. A hitch ball engaging assembly operative to secure to a hitch ball, comprising:
   (a) a socket sized and adapted to matably receive a hitch ball:
   (b) at least one locking element associated with said socket, said locking element movable between,
      (1) a locked state to prevent removal of the hitch ball form said socket and
      (2) an unlocked state to permit insertion and removal of the hitch ball into and out of said socket; and
   (c) a rotatable locking collar journaled for rotation relative to said socket, said locking collar having a recess and a cam face and movable between
      (1) a first position wherein the cam face is operative to move said locking element into the locked state and
      (2) a second position operative to permit said locking element to move into the unlocked state wherein said locking element is received in the recess.

2. A hitch ball engaging assembly according to claim 1 including a latch operative to selectively retain said locking collar in a selected one of the first and second positions.

3. A hitch ball engaging assembly according to claim 1 including an actuator member adapted to move said locking collar between the first and second positions.

4. A hitch ball engaging assembly according to claim 1 wherein said socket has a side wall having a hole formed therethrough with a hole diameter, said locking member being a spherical ball disposed in the hole.

5. A hitch ball engaging assembly according to claim 4 wherein said side wall has a plurality of holes formed therein and said hitch ball engaging assembly includes a plurality of spherical balls, there being a respective spherical ball disposed in a respective hole, each of said spherical ball movable between a locked state thereby to prevent removal of a hitch ball that is received in said socket and an unlocked state to permit insertion and removal of a hitch ball into and out of said socket, said locking collar operative to move each of said spherical ball into the locked state when in the first position and to permit each said spherical ball into the unlocked state when in the second position.

6. A hitch ball engaging assembly according to claim 5 said holes are equiangularly disposed around said side wall.

7. A hitch ball engaging assembly according to claim 1 including:
   (a) a base plate disposed on said socket and
   (b) a retaining ring disposed on said socket in spaced relation to said base plate,
   (c) said locking collar disposed between said retaining ring and said base plate.

8. A hitch ball engaging assembly according to claim 7 including an actuator member secured to said locking collar and adapted to move said locking collar between the first and second positions.

9. A hitch ball engaging assembly according to claim 8 wherein:
   (a) said base plate includes a flange having a slot formed therein;
   (b) said actuator includes an elongated rod projecting radially outwardly from said locking collar, and
   (c) a distal end portion of said rod is received in the slot.

10. A hitch ball engaging assembly according to claim 9 wherein the slot in said flange includes first and second detent sections corresponding to the first and second positions of said locking collar, said detent section operative to selectively retain said rod therein to retain said locking collar in a selected one of the first and second positions.

11. An adapter apparatus operative to interconnect a pin connector of a fifth wheel type tractor/trailer coupling and a hitch ball of a gooseneck type tractor/trailer coupling, comprising:
   (a) an extension member including a first end portion and a second end portion opposite said first end portion;
   (b) a pin connector engaging assembly disposed on said first end portion of said extension member, said pin connector engaging assembly
      (1) sized and adapted to matably receive a pin connector of a fifth wheel type tractor/trailer coupling and
      (2) including at least one attachment element associated therewith,
         (a) said attachment element adapted to releasably engage the pin connector of a fifth wheel type tractor/trailer coupling
         (b) thereby to prevent removal of the pin connector when in an engaged state; and
   (c) a hitch ball engaging assembly disposed on said second end portion of said extension member, said hitch ball engaging assembly
      (1) sized and adapted to matably receive a hitch ball of a gooseneck type tractor/trailer coupling and
      (2) including at least one locking element associated therewith that is movable between a locked state and an unlocked state,
         (a) said locking element when in the locked state operative to lock the hitch ball thereby to prevent removal thereof and
         (b) said locking element when in the unlocked state operative to permit removal of the hitch ball, and
      (3) including a rotatable locking collar having a recess and a cam face, said locking collar movable between a fitst position wherein the cam face is operative to move said locking element into the locked state and a second position operative to permit said locking element to move into the unlocked state wherein said locking element is received in the recess.

12. An adapter apparatus according to claim 11 wherein said extension member is formed as an elongated shaft with said first and second end portions each being hollow.

13. An adapter apparatus according to claim 12 wherein said extension member is a cylindrical tube.

14. An adapter apparatus according to claim 11 wherein said attachment element is a plurality of set screws threadably received in the first end portion of said extension tube.

15. An adapter apparatus according to claim 11 wherein said locking element is a spherical ball bearing.

16. An adapter apparatus according to claim 11 wherein said hitch ball engaging assembly includes a rotatable locking collar movable between a first position operative to move said locking element into the locked state and a second position operative to permit said locking element to move into the unlocked state.

17. An adapter apparatus according to claim 16 wherein said hitch ball engaging assembly includes a latch operative to selectively retain said locking collar in a selected one of the first and second positions.

18. An adapter apparatus according to claim 16 wherein said hitch ball engaging assembly includes an actuator member adapted to move said locking collar between the first and second positions.

19. An adapter apparatus operative to interconnect a pin connector of a fifth wheel type tractor/trailer coupling and a hitch ball of a gooseneck type tractor/trailer coupling, comprising:
   (a) an extension member formed as an elongated tubular piece including a first end portion and a second end portion opposite said first end portion,
      (1) said first end portion including a surrounding first side wall having a first interior sized and adapted to matably receive a pin connector of a fifth wheel type tractor/trailer coupling in a first mated state and
      (2) said second end portion sized including a surrounding second sidewall having a second interior adapted to matably receive a hitch ball of a gooseneck type tractor/trailer coupling in a second mated state,
         (a) said second side wall having a hole formed therethrough with a hole diameter;
   (b) a pin connector engaging assembly disposed on said first end portion of said extension member, said pin connector engaging assembly
      (1) including at least one attachment element associated therewith, said attachment element
         (a) adapted to releasably engage a pin connector of a fifth wheel type tractor/trailer coupling
         (b) thereby to prevent removal thereof when in an engaged state; and
   (c) a hitch ball engaging assembly disposed on said second end portion of said extension member, said hitch ball engaging assembly including
      (1) at least one spherical ball disposed in the hole in said second side wall, said spherical ball movable between
         (a) a locked state thereby to prevent removal of a hitch ball that is received in the second end portion and
         (b) an unlocked state to permit insertion and removal of a hitch ball into and out of the second end portion,
      (2) a rotatable locking collar having a recess and a cam face, said locking collar movable between a first position wherein the cam face is operative to move said spherical ball into the locked state and a second position operative to permit said spherical ball to move into the unlocked state wherein said spherical call is received in the recess.

20. An adapter apparatus according to claim 19 wherein:
(a) said second end portion has a plurality of holes formed therein and
(b) said hitch ball engaging assembly includes a plurality of spherical balls, there being a respective spherical ball disposed in a respective hole, each of said spherical ball movable between
(1) a locked state thereby to prevent removal of a hitch ball that is received in the second end portion and
(2) an unlocked state to permit insertion and removal of a hitch ball into and out of the second end portion
(c) said locking collar having a plurality of cam faces each operative to move a respective said spherical ball into the locked state when in the first position and a plurality of recesses each operative to receive a respective said spherical ball when in the unlocked state when in the second position.

21. An adapter apparatus according to claim 20 wherein said holes are equiangularly disposed around said second end portion.

22. An adapter apparatus according to claim 19 wherein said extension member is formed as an elongated hollow cylindrical tube.

23. An adapter apparatus according to claim 22 including
(a) a base plate disposed on the second end portion of said extension member and
(b) a retaining ring disposed on the second end portion of said extension member in spaced relation to said base plate,
(c) said locking collar disposed between said retaining ring and said base plate.

24. An adapter apparatus according to claim 23 wherein said hitch ball engaging assembly includes an actuator member secured to said locking collar and adapted to move said locking collar between the first and second positions.

25. An adapter apparatus according to claim 24 wherein:
(a) said base plate includes a flange having a slot formed therein;
(b) said actuator includes an elongated rod projecting radially outwardly from said locking collar, and
(c) a distal end portion of said rod being received in the slot.

26. An adapter apparatus according to claim 25 wherein the slot in said flange includes first and second detent sections corresponding to the first and second positions of said locking collar, said detent section operative to selectively retain said rod therein to retain said locking collar in a selected one of the first and second positions.

27. An adapter apparatus according to claim 19 wherein said hitch ball engaging assembly includes a latch operative to selectively retain said locking collar in a selected one of the first and second positions.

28. An adapter apparatus operative to interconnect a pin connector of a fifth wheel type tractor/trailer coupling and a hitch ball of a gooseneck type tractor/trailer coupling, comprising:
(a) an elongated cylindrical tube including a surrounding side wall defining a hollow interior and having a first end and a second end opposite said first end, said tube including
(1) a first end portion sized and adapted to matably receive a pin connector of a fifth wheel type tractor/trailer coupling in a first mated state and
(2) a second end portion sized and adapted to matably receive a hitch ball of a gooseneck type tractor/trailer coupling in a second mated state, and having (a) a plurality of holes formed through said sidewall proximately to the second end;
(b) a base plate secured to the second end of said tube;
(c) a retaining ring secured to the second end portion of said extension member in spaced relation to said base plate,
(1) the holes in said second end portion located between said base plate and said retaining ring;
(d) a plurality of ball bearings, there being a respective ball bearing in a respective one of the holes, each said ball bearing movable between
(1) a locked state thereby to prevent removal of a hitch ball that is received in the second end portion and
(2) an unlocked state to permit insertion and removal of a hitch ball into and out of the second end portion,;
(e) a locking collar rotatably disposed between said retaining ring and said base plate and constrained thereby against longitudinal movement, said locking collar
(1) operative to retain each said ball bearing in its respective said hole,
(2) movable between a first position operative to move each said ball bearing into the locked state and a second position operative to permit each said ball bearing to move into the unlocked state.

29. An adapter apparatus according to claim 28 including a pin connector engaging assembly disposed on said first end portion of said extension member, said pin connector engaging assembly
(a) including at least one attachment element associated therewith,
(1) said attachment element adapted to releasably engage a pin connector of a fifth wheel type tractor/trailer coupling
(2) thereby to prevent removal thereof when in an engaged state.

30. An adapter apparatus according to claim 28 including an actuator member secured to said locking collar and adapted to move said locking collar between the first and second positions.

31. An adapter apparatus according to claim 30 wherein:
(a) said base plate includes a flange having a slot formed therein;
(b) said actuator includes an elongated rod projecting radially outwardly from said locking collar, and
(c) a distal end portion of said rod is received in the slot.

32. An adapter apparatus according to claim 31 wherein the slot in said flange includes first and second detent sections corresponding to the first and second positions of said locking collar, said detent section operative to selectively retain said rod therein to retain said locking collar in a selected one of the first and second positions.

33. An adapter apparatus according to claim 28 wherein said holes are equiangularly disposed around said second end portion.

34. An adapter apparatus according to claim 28 wherein said locking collar has a plurality of recesses each operative to receive a respective one of said ball bearings in the unlocked state when said locking collar is in the second first position and a plurality of cam faces each operative to place a respective one of said ball bearings in the locked state when said locking collar is in the first position.

35. In a tractor/trailer combination wherein a tractor vehicle is provided with a bed-mounted hitch ball adapted for connection to a gooseneck type coupling and wherein a trailer vehicle is provided with a fifth wheel type pin connector, an improvement comprising an extension member formed as an elongated, hollow cylindrical tube having a sidewall and including a hollow first end portion sized to receive the pin connector and a hollow second end portion opposite said first end portion sized to receive the hitch ball, said extension member including a pin connector engaging assembly disposed on said first end portion of said extension member, said pin connector engaging assembly sized and adapted to matably receive the pin connector and having at least one attachment element associated therewith that is adapted to releasably engage the pin connector thereby to prevent removal of the mated pin connector when in an engaged state, and a hitch ball engaging assembly disposed on said second end portion of said extension member, said hitch ball engaging assembly including at least one spherical ball bearing located in a hole formed in the sidewall of the second end portion and movable between an locked state and an unlocked state, and a rotatable locking collar rotatable between a first rotational position thereby to move said ball bearing into the locked state and a second rotational position thereby to permit said locking element to move into the unlocked state, said ball bearing when in the locked state operative to lock the mated hitch ball thereby to prevent removal thereof from the second end portion of said tube and said ball bearing when in the unlocked state operative to permit removal of the mated hitch ball from the second end portion of said tube.

36. The improvement according to claim 35 wherein said hitch ball engaging assembly includes a latch operative to selectively retain said locking collar in a selected one of the first and second positions.

37. The improvement according to claim 35 said hitch ball engaging assembly includes an actuator member adapted to move said locking collar between the first and second positions.

38. A method of interconnecting a pin connector of a fifth wheel type tractor/trailer coupling and a hitch ball of a gooseneck type tractor/trailer coupling, comprising:

(a) providing a hollow, cylindrical tube having a surrounding sidewall and first and second end portion;

(b) releasably securing said pin connector inside of said first end portion;

(c) mating said hitch ball inside of said second end portion of said tube;

(d) providing a locking element in a hole formed in said second end portion, said locking element being movable between a locked state that is operative to lock the mated hitch ball thereby to prevent removal thereof and an unlocked state operative to pemit removal of the mated hitch ball; and (e) releasably securing said hitch ball inside of said second end portion by rotatably moving a collar that surrounds said second end portion whereby a cam face on said collar moves said locking element into the locked state.

39. A method according to claim 38 including the step of selectively retaining said locking element in the locked state and in the unlocked state.

40. A hitch ball engaging assembly operative to secure to a hitch ball, comprising:

(a) a socket sized and adapted to matably receive a hitch ball:

(b) at least one locking element associated with said socket, said locking element movable between,
  (1) a locked state to prevent removal of the hitch ball from said socket and
  (2) an unlocked state to permit insertion and removal of the hitch ball into and out of said socket;

(c) a base plate disposed on said socket and including a flange having a slot formed therein, the slot in said flange having fitst and second detent section;

(d) a retaining ring disposed on said socket in spaced relation to said base a plate;

(e) a rotatable locking collar disposed between said retaining ring and said base plate and journaled for rotation relative to said socket and movable between
  (1) a first position operative to move said locking element into the locked state and
  (2) a second position operative to permit said locking element to move into the unlocked state;

(f) an actuator member secured to said locking collar and adapted to move said locking collar between the first and second positions, said actuator including an elongated rod projecting radially outwardly from said locking collar with a distal end portion of said rod being received in the slot of said flange, said first and second detent section respectively corresponding to the first and second positions of said locking collar and operative to selectively retain said rod therein to retain said locking collar in a selected one of the first and second positions.

41. A hitch ball engaging assembly operative to secure to a hitch ball, comprising:

(a) a socket sized and adapted to matably receive a hitch ball:

(b) at least one locking element associated with said socket, said locking element movable between,
  (2) a locked state to prevent removal of the hitch ball form said socket and
  (2) an unlocked state to permit insertion and removal of the hitch ball into and put of said socket;

(c) a base plate disposed on said socket;

(d) a retaining ring disposed on said socket in spaced relation to said base plate;

(e) a rotatable locking collar disposed between said retaining ring and said base plate and journaled for rotation relative to said socket and movable between
  (1) a first position operative to move said locking element into the locked state and
  (2) a second position operative to permit said locking element to move into the unlocked state; and (f) an elongated actuator rod projecting radially outwardly from said locking collar and adapted upon manipulation to move said locking collar between the first and second positions.

* * * * *